United States Patent
Marcheguet et al.

(10) Patent No.: US 6,389,363 B1
(45) Date of Patent: May 14, 2002

(54) PROCESS FOR CALCULATING THE TORQUE OF AN ELECTRONIC INJECTION INTERNAL COMBUSTION ENGINE

(75) Inventors: Eric Marcheguet, Chatou; Xavier Moine, Rueil Malmaison, both of (FR)

(73) Assignee: Renault, Boulogne Billancourt (FR)

( * ) Notice: Subject to any disclaimer, the term of this patent is extended or adjusted under 35 U.S.C. 154(b) by 0 days.

(21) Appl. No.: 09/331,194

(22) PCT Filed: Dec. 12, 1997

(86) PCT No.: PCT/FR97/02280

§ 371 Date: Sep. 30, 1999

§ 102(e) Date: Sep. 30, 1999

(87) PCT Pub. No.: WO98/29718

PCT Pub. Date: Jul. 9, 1998

(30) Foreign Application Priority Data

Dec. 27, 1996 (FR) .............................. 96 16140

(51) Int. Cl.[7] .................................. G01L 3/10
(52) U.S. Cl. .......................... 702/41; 73/116
(58) Field of Search ................ 60/597; 73/116; 712/200; 702/41

(56) References Cited

U.S. PATENT DOCUMENTS

| | | | | |
|---|---|---|---|---|
| 3,888,116 A | * | 6/1975 | Spinella ..................... 73/136 |
| 4,455,980 A | * | 6/1984 | Sasayama et al. .......... 123/425 |
| 4,732,125 A | * | 3/1988 | Takizawa .................... 123/422 |
| 4,915,076 A | * | 4/1990 | Takizawa .................... 123/418 |
| 5,496,227 A | * | 3/1996 | Minowa et al. .............. 477/62 |
| 5,772,555 A | * | 6/1998 | Minowa et al. ............. 477/109 |
| 6,145,489 A | * | 11/2000 | Kazama et al. ............. 123/295 |

FOREIGN PATENT DOCUMENTS

| | | | | |
|---|---|---|---|---|
| DE | 19810935 A1 | * | 9/1999 | ............ F02B/3/10 |
| FR | 2735232 | * | 12/1996 | .......... F02B/77/08 |
| WO | WO95/04879 | * | 2/1995 | .......... F02D/41/34 |

\* cited by examiner

Primary Examiner—John S. Hilten
Assistant Examiner—Douglas N Washburn
(74) Attorney, Agent, or Firm—Oblon, Spivak, McClelland, Maier & Neustadt, P.C.

(57) ABSTRACT

Process for calculating the torque of an internal combustion engine having electronic injection. The method includes having a cogged target with an indexed reference rotating before a fixed sensor. The defects of the target are corrected by distinguishing the combustion interval of the target from the reference. A term assigned to each interval is $g(b)_i$ which is determined in the absence of combustion from the measurement of the engine torque which is proportional to the pressure in the commutator represented by the equation $C_i = K.P_{coll} = \alpha(\Sigma N + \$g(b)_i)N^2$ where $C_i$ is the engine torque, $P_{coll}$ is the pressure, $N$ is the engine power, $K$ is the proportionality factor and $\alpha$ is a constant term.

13 Claims, 3 Drawing Sheets

Figure 1:
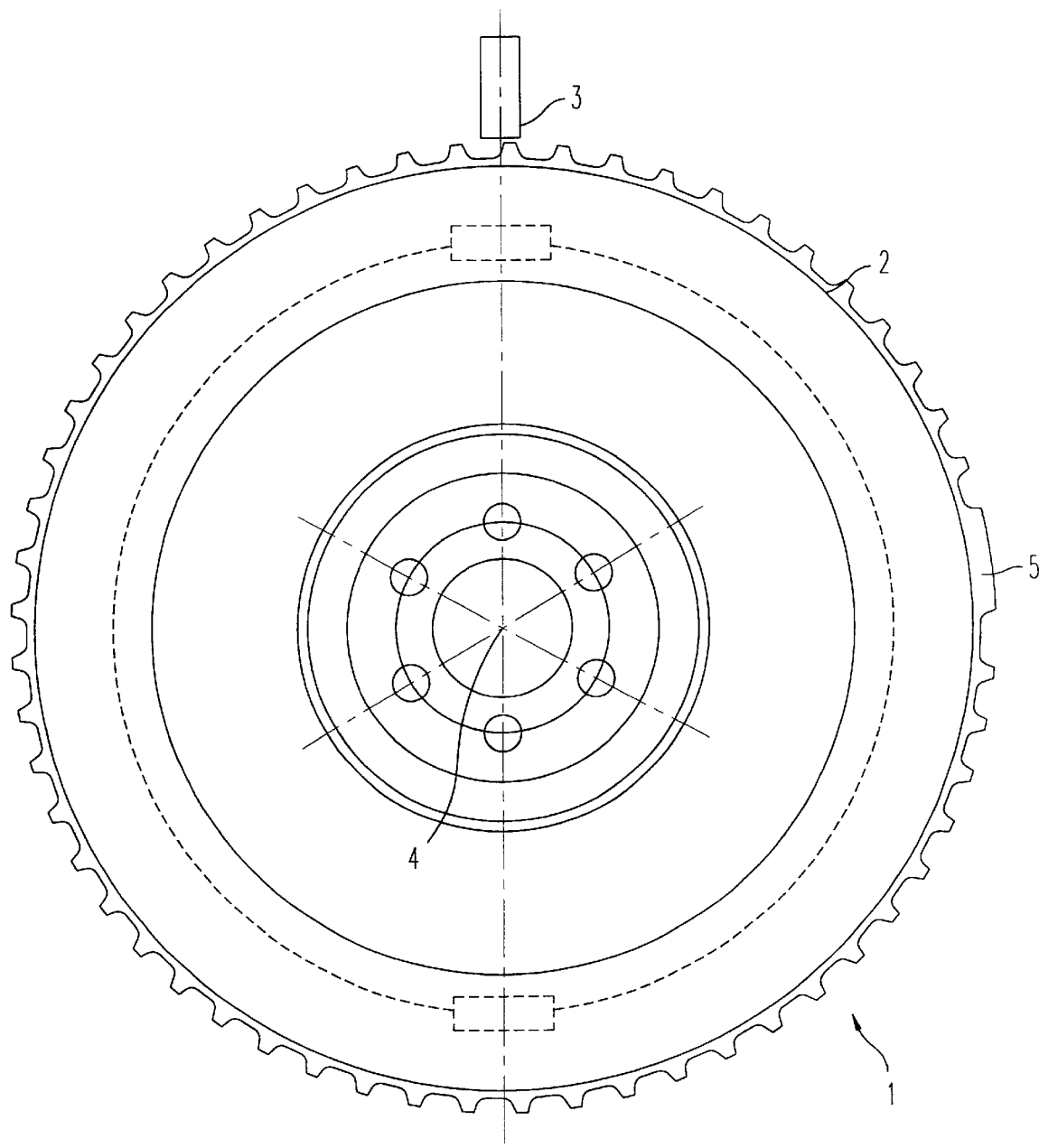

PROCESS FOR CALCULATING THE TORQUE OF AN ELECTRONIC INJECTION INTERNAL COMBUSTION ENGINE

BACKGROUND OF THE INVENTION

1. Field of the Invention

The invention relates to a process for calculating the torque of a four-stroke internal combustion heat engine with electronically controlled injection, especially mounted in an automobile vehicle.

2. Discussion of the Background

More precisely, the measured torque is the mean gas torque produced by the firings of the air-gasoline mixture in the alp different cylinders. It is advantageous to measure the torque precisely over a large number of firings in order to optimize certain adjustments of the engine, in particular by virtue of the electronic injection computer, and in order to diagnose certain operating malfunctions, including misfires. A misfire in one cylinder of an engine with controlled injection may be due, for example, to lack of sparking, poor fuel supply or poor compression. Such recognition of poor firing is required by European regulations (European On Board Diagnostic: EOBD) or international regulations (On Board Diagnostic: OBD II), relating to diagnostic systems integrated into the vehicles in order to monitor exhaust system emissions for conformity with antipollution standards.

The process for measuring such a torque uses a device comprising an annular target, which is integral with the flywheel of the engine or with the crankshaft and which is provided on its circumference with marks such as teeth, which pass in front of a fixed sensor. The instantaneous value of the period of passage of the teeth in front of the sensor corresponds to the measurement of instantaneous power produced in each cylinder of the engine successively. Electronic computer means use the signal delivered by the sensor to calculate the mean gas torque $C_g$ produced by each firing of the gaseous mixture in each cylinder of the engine.

In the particular case of a four-cylinder four-stroke gasoline engine operating in the Beau de Rochas cycle, each of the four strokes of the cycle—intake, compression, firing-expansion, exhaust—takes place during one particular half-revolution of the flywheel which is integral with the engine crankshaft. The kinetic energy acquired by the system in question, or in other words the crankshaft and flywheel with alternating masses, is the resultant of different instantaneous negative and positive torques exerted thereon during each of the different strokes of the engine's operating cycle. The gas torque Cg is calculated in each half-revolution. This torque is generated during these phases of compression and firing-expansion of the gaseous mixtures confined respectively in two cylinders with contiguous firings (1 and 4, 2 and 3). The other two cylinders are then in intake and exhaust phases. Since the compression phases are less susceptible to variations or dispersion than the firing-expansion phases, it is considered that the gas torque $C_g$ calculated over one half-revolution is relative to the firing cylinder, and therefore that it is an estimate of the mean gas torque over the two phases of compression and firing-expansion of the same cylinder, which therefore confines the same gaseous mixture.

As an example, the target is provided over its periphery with 57 regularly spaced, identical teeth, each formed by a peak and a hollow, and with one reference tooth, which has greater width equivalent to three other teeth and serves as the indexing origin to permit numbering of the said teeth. For a four-stroke four-cylinder engine, the angular period T of the firings concerns 30 teeth and is equal to half of the period of revolution of the crankshaft. For a four-stroke six-cylinder engine, the angular period of the firings T concerns only 20 teeth, and so on.

The fixed sensor may be of variable reluctance type, adapted to deliver an alternating signal of frequency proportional to the speed of passage of the teeth of the ring, or in other words proportional to the instantaneous speed of the flywheel.

A modern process for calculating the mean gas torque is described in French Patent Application filed under No. 95-06780 in the name of the Applicant, comprising:

producing a primary numerical value d, representative of the instantaneous duration of passage in front of the sensor of each tooth of the target, from these numerical values $d_j$, calculating a first secondary numerical value T representative of the total duration of passage in front of the sensor of each series of n teeth defining the angular interval of firings in the engine, calculating a second secondary numerical value Σ representative of the projection, on the phase reference line of the teeth corresponding to the origin of the angular periods of the firings, of the amplitude of the alternating component of the instantaneous durations $d_j$ of passage of the teeth in front of the sensor at the frequency of firings in the engine, this value Σ being defined, for example, by the relationship:

$$\Sigma = \sum_{j=0}^{(n-1)} d_j \cos(2\pi j/n)$$

calculating the sought numerical value $C_g$ from the following relationship (E):

$$C_g = \alpha(\Sigma/T^3 + \beta/T^2) \qquad (E)$$

which is valid over an interval T, regardless of engine rpm,

α and β being two experimentally determined constants.

The term α is a constant term proportional to the rotary inertia of the engine, and β is a term which is a function of the moment of intertia of the alternating masses. The irregularities of position of marks on the ring will, in a first approximation, perturb the value of the term $\beta/T^2$.

To ensure that measurement of the mean gas torque will be reliable and usable, especially in strategies for detection of poor firings of an engine, calculated by the injection computer, it is indispensable to eliminate defects of the target such as irregularities of position of the marks, which can cause unacceptable risks of false detection of poor firings, which risks increase with rpm.For this reason the objective of the invention is to acquire and correct defects of the target and to adapt to dispersions and to engine wear.

SUMMARY OF THE INVENTION

For this purpose, the object of the invention is a process for calculation of the torque of an internal combustion heat engine with injection controlled by an electronic computer, the engine being such that a target, for example in the form of a toothed ring provided with an indexing reference, is integral with the crankshaft and turns in front of a tooth-passage sensor, mounted in fixed position close to the target and delivering a signal to electronic torque-calculating means, said process comprising calculating, on the basis of numerical values $d_j$ represenative of the instantaneous duration of passage of each tooth in front of the sensor, a numerical value $\Sigma$ representative of the projection, on the phase reference line of the teeth corresponding to the origin of the angular periods of the firings, of the amplitude of the alternating component of the instantaneous durations $d_j$ at the frequency of firings in the engine, characterized in that it comprises correcting the defects of the target by the following stages:

distinguishing between the angular intervals $T_i$ of the firings of the target relative to the reference, where i is an integer (equal to 1 or 2 for a four-cylinder engine);

assignment of a term $\beta_1$ for each angular interval $T_i$;

recognition of torque conditions corresponding to nonfiring, such as cutoff of fuel injection into the cylinders;

acquisition of the term $\beta_i$ under the said conditions of nonfiring by measurement of the engine torque $C_i$, which is proportional to the pressure $P_{manifold}$ in the intake manifold according to the relationship:

$$C_i = KP_{manifold} = \alpha(\Sigma N + \beta_i)N^2$$

calculation of the engine torque $C_{gi}$ delivered upon each firing, corresponding to each interval $T_i$ of the target, from the term $\beta_i$, which is obtained from the equation:

$$C_{gi} = \alpha(\Sigma N + \beta_i)N^2$$

where N is the engine rpm and K is a proportionality coefficient.

Figure 2:
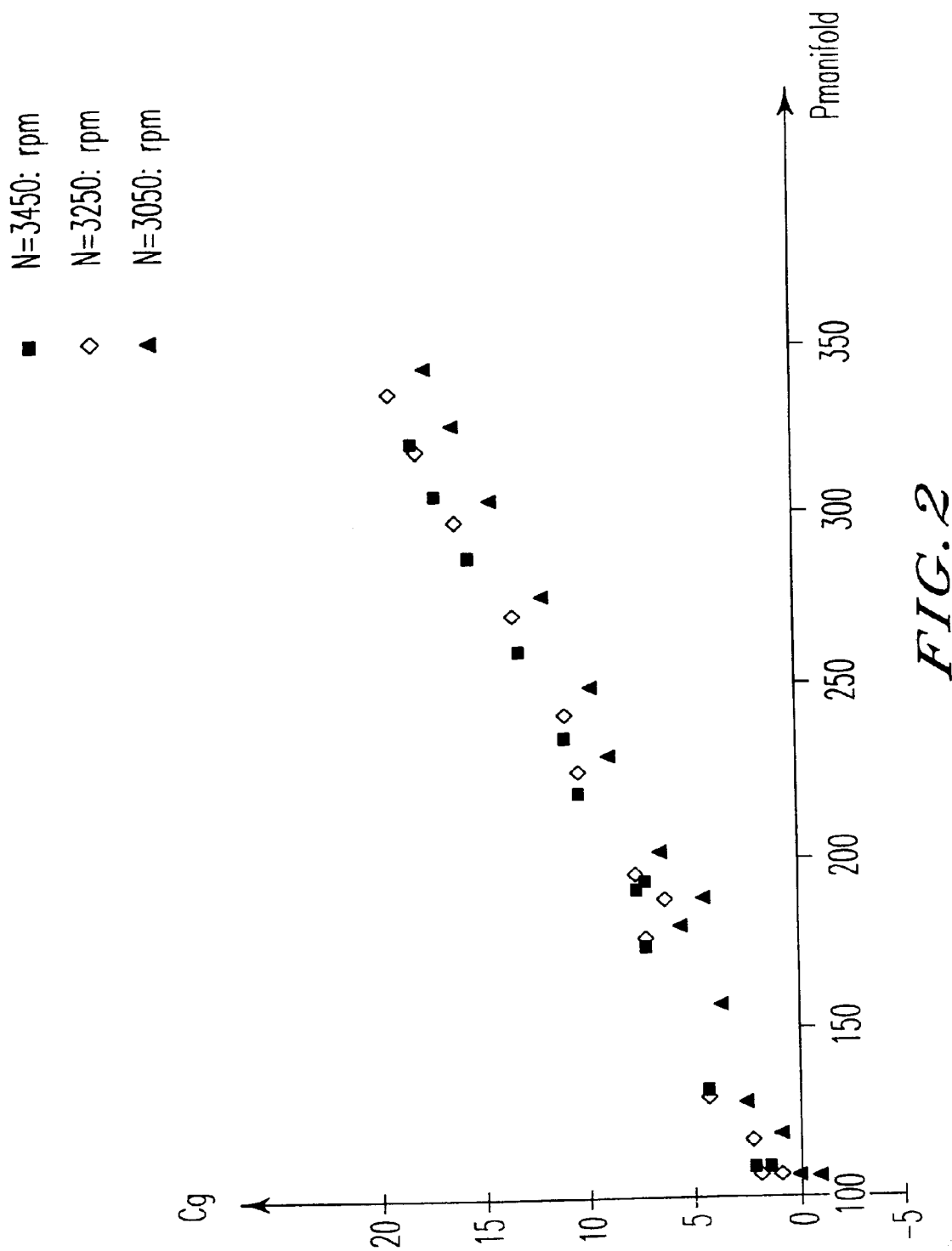
Figure 3:
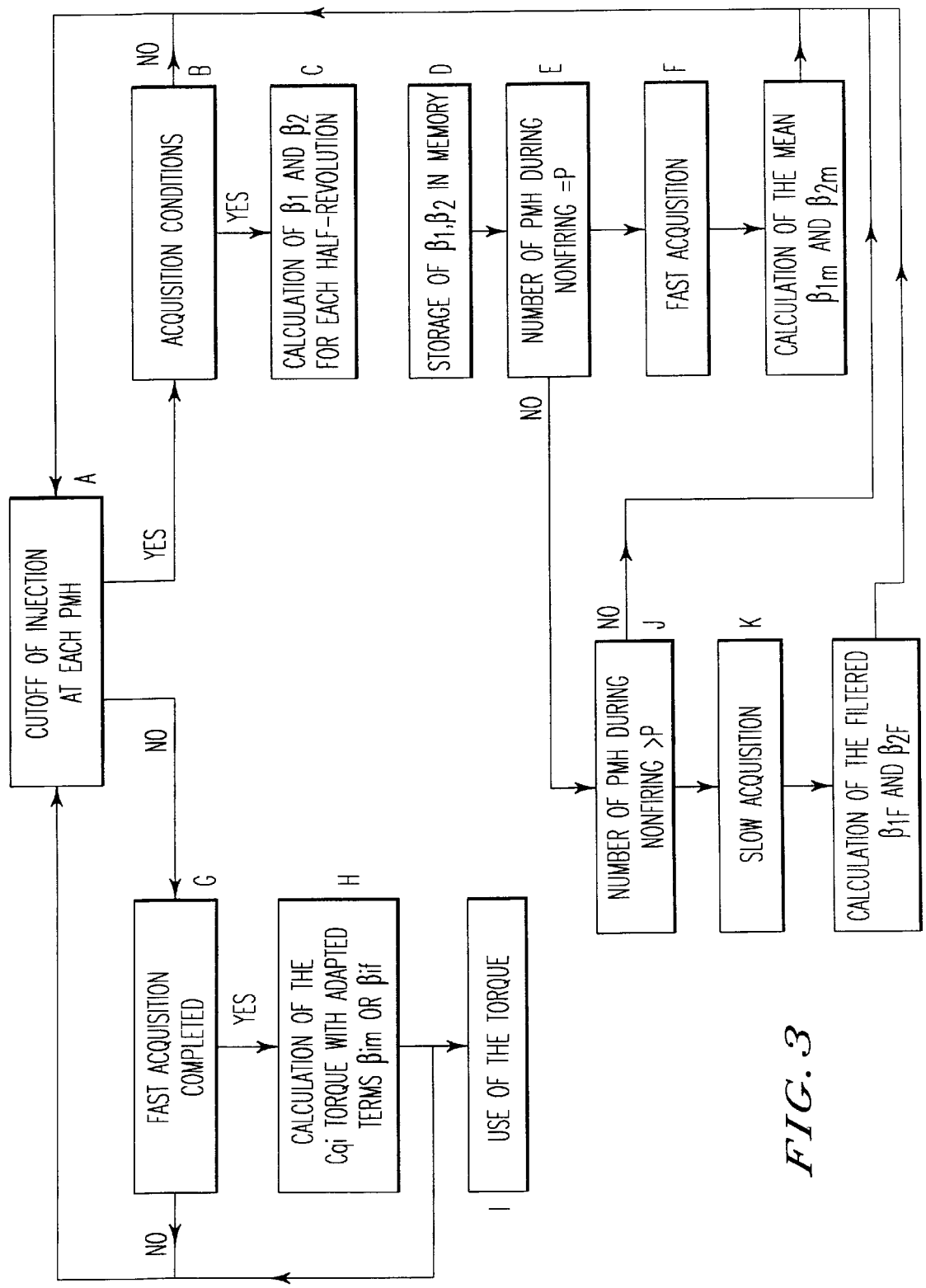

Other characteristics and advantages of the invention will become clear upon reading the description of a particular embodiment illustrated by the following figures, which are:

FIG. 1: a front view of a toothed target, mounted on the flywheel of an internal combustion engine;

FIG. 2: curves of variation of measured mean gas torque $C_g$ as a function of manifold pressure $P_{manifold}$ for three different values of engine rpm N;

FIG. 3: a flow diagram of the different stages of the process for calculating the engine torque according to the invention.

The invention, applied to a four-cylinder four-stroke internal combustion engine, comprises acquisition the defects of each half-revolution of the toothed target mounted at the end of the crankshaft, for the purpose of correcting the calculation of the mean gas torque produced during each firing. In fact, large differences between the measured torques are observed depending on the half-revolution of the target on which the calculation is performed. These differences may have several causes, such as the machining of the target, a front view of which is shown in FIG. 1. Imperfect machining of target 1 leads to defects in the measurements of the time for each tooth 2 to pass in front of sensor 3, as does poor centering of axis 4 of the target, which no longer rotates along a circle. Poor machining of index tooth 5 means that the electronic input stage of the torque-measuring device passes on an error into the calculation, which leads to signal deformations. Finally, the mounting of the target at the end of the crankshaft can cause problems of twisting and bending of the crankshaft. In all cases, the defect is manifested by errors in measurement of the time which elapses during a given angular displacement of the target.

It is shown that there appears a term proportional to the square of the rpm N or to the square of the reciprocal firing period T. The calculation of the mean gas torque $C_g$ by the principle of the software torquemeter, which is based on the fact that the amplitude of the variations of instantaneous crankshaft speed is proportional to the gas torque and is estimated from the variation of duration of the teeth of the target, is performed according to equation (E), as already given:

$$C_g = \alpha(\Sigma/T^3 + \beta/T^2) \quad (E)$$
$$= \alpha(\Sigma N + \beta)N^2$$

where T is a numerical value representative of the total duration of passage in front of the sensor of each series of n teeth defining the angular interval of firings in the engine, and where $\Sigma$ is a value representative of the projection, on the phase reference line of the teeth corresponding to the origin of the angular periods of the firings, of the amplitude of the alternating component of the instantaneous durations $d_i$ of passage of the teeth in front of the sensor at the frequency of firings in the engine.

The correction of the mean gas torque therefore implies a correction of the foregoing equation at the level of the $N^2$ term, or in other words the acquisition of a term $\beta$ relating to the angular sector to be acquired. For a four-cylinder engine, firing takes place for each half-revolution in such a way that these half-revolutions must be distinguished from each other, in order to evaluate the error on each of them from the reference tooth.

A term $\beta_i$ is then assigned to each of the two half-revolutions $T_i$, where i is an integer equal to 1 or 2, and the torque $C_{gi}$ is calculated from the term $\beta_i$ according to equation (E), which becomes:

$$C_{gi} = \alpha(\Sigma N + \beta_i)N^2.$$

According to a fundamental characteristic of the invention, the term $\beta_i$ is acquired under torque conditions corresponding to an absence of firing, otherwise known as nonfiring, in all cylinders, as occurs, for example, during cutoff of fuel injection by the electronic computer. This state of zero gas torque must be recognized, ensuring that none of the cylinders generates engine torque.

However, if the mean gas torque is zero, the measured torque is nonzero, because of the effects of pumping and compression of air which take place in the cylinders under the effect of crankshaft rotation. This torque measured in the absence of firing is a function of the pressure in the intake manifold, measured by a pressure sensor, and therefore of the acquisition conditions (rpm, leakage flow at the throttle valve, etc.). It is considered that the torque measured at zero gas torque varies linearly with pressure $P_{manifold}$ in the manifold, or in other words that its value is proportional to $P_{manifold}$.

In the absence of firing, the measured torque C; for each of the half-revolutions $T_i$ of the target is obtained by the following equation:

$$C_i = KP_{manifold} \quad (E_1)$$

For each half-revolution, it is therefore necessary to calculate the term $\beta_i$, which is the solution of the equation $(E_1)$:

$$C_i = KP_{manifold} = (\Sigma N + \beta_i)N^2 \quad (E_1)$$

or in other words: $\alpha(\Sigma N + \beta_i)N^2 - KP_{manifold} = 0$.

From this term $\beta_i$ obtained as in the foregoing, the engine torque $C_{gi}$ is calculated from the equation:

$$C_{gi} = \alpha(\Sigma N + \beta_i)N^2$$

According to one characteristic of the invention, the acquisition of values of $\beta_i$ comprises a first stage, known as fast acquisition, which takes place over a specified number P of successive top dead points during nonfiring, for example at the end of the vehicle assembly line on which there is mounted the engine controlled by an electronic ignition-injection computer, and of a second stage, known as slow acquisition, during operation of the engine.

In order to achieve adapted acquisitions as quickly as possible during vehicle use, the first stage of fast acquisition comprises calculating the mean $\beta_{im}$ of the first values of the term $\beta_i$ (pmh), calculated from equation ($E_1$), over a specified number P, such as one hundred, of top dead points during nonfiring, where (pmh) is an integral number between 1 and P corresponding to the order number of the top dead point initialized at the start of operation of the computer:

$$\beta_{im} = \frac{\beta_i(1) + \beta_i(2) + \ldots \beta_i(P)}{P}$$

This stage makes it possible to achieve good acquisition upon discharge from the assembly line, under stable, controlled and known operating conditions, on a rolling dynamometer, for example, by virtue of rapid adaptation to the manufacturing dispersions. This mean value $\beta_{im}$, stored in the memory of the electronic computer, is then used for calculation of the torque $C_g$ upon discharge from the vehicle assembly line.

In the particular case of an automobile vehicle whose electronic control computer has been changed during the life of the vehicle, fast acquisition of the terms $\beta_1$ and $\beta_2$ always takes place over a number P of top dead points counted in one or more phases of nonfiring of the engine.

For adaptation to aging of the vehicle, the stage of slow acquisition comprises, in each phase of nonfiring, regardless of its duration counted in top dead points, strongly filtering each value of the term $\beta_i$(pmh) corresponding to the half-revolution of order i, calculated at each top dead point of order pmh, so as to avoid taking into account the values acquired during conditions which are not representative of operation of the engine. For a crankshaft half-revolution i under consideration at the top dead point of order pmh, the value of $\beta_{if}$(pmh) obtained by this first-order filtering is equal to the filtered value $\beta_{if}$(pmh–1) at the preceding top dead point of order pmh–1, to which there is added a fraction of the difference between the measured value $\beta_i$(pmh) and the filtered value $\beta_{if}$(pmh–1):

$$\beta_{if}(\text{pmh}) = \beta_{if}(\text{pmh}-1) + q[\beta_i(\text{pmh}) - \beta_{if}(\text{pmh}-1)]$$

where q is the filtering coefficient determined according to the response time desired to take the acquisition into account, and pmh is an integral number larger than P and smaller than or equal to D, corresponding to the end of the deceleration phase.

This filtered value $\beta_{if}(D) = \beta_{if}$, obtained at the end of deceleration at the top dead point of order D, is used for calculation of the engine torque $C_g$ at each top dead point of the subsequent acceleration phase of the engine:

for half-revolution 1: $C_{g1} = \alpha[\Sigma N + \beta_{1f}]N^2$
for half-revolution 2: $C_{g2} = \alpha[\Sigma N + \beta_{2f}]N^2$.

According to another characteristic, slow acquisition takes place between two thresholds of engine rpm, which are calibration variables. As a non-limitative example, a value of 3000 rpm can be chosen for the minimum threshold and of 3500 rpm for the maximum threshold.

Thus a phase of slow acquisition of the terms $\beta_1$ and $\beta_2$ takes place during each phase of absence of firing of the engine, regardless of the duration thereof, permitting the engine torque to be calculated in such a way that defects of the target are taken into account.

FIG. 3 groups, in the form of a flow chart, the different stages of the process of calculating the torque of an engine according to the invention.

First of all this process calculates the mean gas torque at each top dead point, referenced by the index pmh, in such a way that, at each such point, there must take place stage a, which comprises recognizing whether the engine is in firing or nonfiring phase, for example by cutoff of fuel injection into the cylinders.

If the engine is in nonfiring phase, the acquisition conditions concerning, for example, the engine rpm N or the leakage flow at the throttle valve, must be met (stage b) in order that the calculation of the terms $\beta_1$ and $\beta_2$ for each of the half-revolutions is performed (stage c) starting from the value of the pressure $P_{manifold}$ in the intake manifold. The terms $\beta_1$ and $\beta_2$ calculated in this way are then stored in memory for a duration d. Then the order number pmh of the top dead point in question is examined and compared with a minimum threshold P necessary to take into consideration the values of $\beta_1$ and $\beta_2$ stored in memory (stage e). As soon as the order number pmh of the top dead point is equal to P, there is authorized a so-called fast acquisition stage f, during which there is calculated the mean of each of the terms $\beta_1$ and $\beta_2$ over the number P of top dead points taken into consideration since the start of the process. This mean value of the terms $\beta_1$ and $\beta_2$ will be used to calculate the engine torque at the ensuing top dead points, during the phases of acceleration of the engine.

Thus, at the ensuing top dead point for which firing is recognized (stage a), it is checked whether fast acquisition of the terms $\beta_1$ and $\beta_2$ has already taken place (stage g), in which case the calculation of the mean gas torque $C_{gi}$ is performed starting from the two adapted terms $\beta_{1m}$ and $\beta_{2m}$ corresponding to the two half-revolutions (stage h), and is subsequently used in, for example, an engine control strategy (stage i).

During stage e, if the order number pmh of the top dead point in question is lower than the threshold P (stage j), the terms $\beta_1$ and $\beta_2$ calculated in stage c are not taken into account for calculation of the engine torque as long as pmh is not equal to P, regardless of whether the vehicle is at the end of the assembly line with a first electronic computer or is in the course of service with a new computer. In contrast, if the order number pmh of the top dead point in question is higher than the threshold P, in which case fast acquisition has necessarily taken place previously, a so-called slow acquisition stage k comprises filtering the terms $\beta_1$ and $\beta_2$ calculated in stage c in order to deliver the filtered values $\beta_{1f}(n)$ and $\beta_{2f}(n)$ at the top dead point of order pmh=n. The filtered value $\beta_{if}(D) = \beta_{if}$, obtained at the end of deceleration at the top dead point of order pmh=D, is used for calculation of the engine torque $C_g$ at each top dead point of the ensuing acceleration phase of the engine.

This process of calculating the torque of a heat engine by correcting the defects of the target can be used advantageously in all engine control strategies based on torque analysis, such as diagnosis of poor firing or recognition of the order of occurrence of firing in the different cylinders, in order to achieve optimization of controlled electronic ignition. Quite obviously this calculation process which has just been described with reference to a four-cylinder engine is applicable to any engine, regardless of the number of cylinders, the working period then being no longer the half-revolution but instead the interval during which firing takes place.

What is claimed is:

1. A process for calculation of the torque of a four-stroke internal combustion heat engine with electronically controlled injection, the engine being such that a target provided with an indexing reference is integral with a crankshaft and moves in front of a tooth-passage sensor, mounted in fixed position close to the target and delivering a signal to electronic torque-calculating means, said process comprising calculating, on the basis of numerical values representative of the instantaneous duration of passage of each tooth in front of the sensor, a numerical value representative of the projection, on the phase reference line of the teeth corresponding to the origin of the angular periods of the firings, of the amplitude of the alternating component of the instantaneous durations at the frequency of firings in the engine, characterized in that it comprises correcting the defects of the target by:

distinguishing between the angular intervals ($T_i$) of the firings of the target relative to the reference;

assignment of a term ($\beta_i$) for each angular interval ($T_i$); and at each top dead point:

recognition of torque conditions corresponding to absence of firing in the cylinders;

acquisition of the term ($\beta_i$) under the said conditions of nonfiring by measurement of the engine torque ($C_i$), which is proportional to the pressure ($P_{manifold}$) in the intake manifold according to the relationship:

$$C_i = K_{manifold} = \alpha(\Sigma N + \beta_i)N^2$$

where N is the engine rpm, K is a proportionality coefficient and $\alpha$ is a constant term;

calculation of the engine torque ($C_{gi}$) delivered during the phase of acceleration of the engine upon each firing, corresponding to each angular interval ($T_i$), from the term ($\beta_i$), which is obtained from the equation:

$$C_{gi} = \alpha(\Sigma N + \beta_i)N^2.$$

2. A process for calculating the torque according to claim 1, characterized in that the acquisition of the term ($\beta_i$) performed during the phase of nonfiring of the engine under acquisition conditions which are specified with respect to the rpm and the leakage flow at a throttle valve in particular, comprises:

a stage of fast acquisition over the first P top dead points of order (pmh), where (pmh) is an integral number between 1 and P, initialized at the start of operation of the computer, comprising calculating the mean ($\beta_{im}$) of the P first values of [$B_i$(pmh)] corresponding to the interval ($T_i$):

$$\beta_{im} = \frac{\beta_i(1) + \beta_i(2) + \ldots \beta_i(P)}{P}$$

this mean value being used for calculation of the engine torque ($C_{gi}$) during the ensuing acceleration phase, followed by:

a stage of slow acquisition performed during operation of the engine in each phase of nonfiring, comprising filtering of the first order of each value [$B_i$(pmh)] corresponding to the interval ($T_i$), calculated at each top dead point of order (pmh):

$$\beta_{if}(pmh) = \beta_{if}(pmh-1) + q$$

delivering a filtered value as a function of the filtered value at the preceding top dead point of order (pmh−1) and of a filtering coefficient (q) chosen according to the response time desired for calculation of the torque, the final filtered value obtained at the last top dead point of the nonfiring phase being used for calculation of the engine torque ($C_{gi}$) during the subsequent firing phase.

3. A process for calculating the torque according to claim 1, characterized in that the slow acquisition of the term ($\beta_i$) takes place between two thresholds of engine rpm, which are calibration variables, for example the minimum threshold being 3000 rpm and the maximum threshold being 3500 rpm.

4. A process for calculating the torque according to claim 1, for a four-cylinder heat engine, characterized in that it comprises correcting the defects of the target by:

distinguishing between each of the two half-revolutions ($T_i$) of the target relative to the reference, where i is an integer equal to 1 or 2;

assignment of a term ($\beta_i$) for each half-revolution ($T_i$); and at each top dead point:

recognition of torque conditions corresponding to absence of firing in the cylinders;

acquisition of the term ($\beta_i$) under the said conditions of nonfiring by measurement of the engine torque ($C_i$), which is proportional to the pressure ($P_{manifold}$) in the intake manifold according to the relationship:

$$C_i = KP_{manifold} = \alpha(\Sigma N + \beta_i)N^2$$

where N is the engine rpm, K is a proportionality coefficient and $\alpha$ is a constant term;

calculation of the engine torque ($C_{gi}$) delivered during the phase of acceleration of the engine upon each firing, corresponding to each half-revolution ($T_i$), from the term ($\beta_i$), which is obtained from the equation:

$$C_{gi} = \alpha(\Sigma N + \beta_i)N^2.$$

5. A process for calculating the torque according to claim 4, characterized in that the acquisition of the term ($\beta_i$), performed during nonfiring phase of the engine under acquisition conditions which are specified with respect to the rpm and the leakage flow at a throttle valve in particular, comprises:

a stage of fast acquisition over the first P top dead points of order (pmh), where (pmh) is an integral number between 1 and P, initialized at the start of operation of a computer, comprising calculating the mean ($\beta_{im}$) of the P first values of [$\beta_i$(pmh)] during the phase of nonfiring, corresponding to the half-revolution ($T_i$) of order i:

$$\beta_{im} = \frac{\beta_i(1) + \beta_i(2) + \ldots \beta_i(P)}{P}$$

this mean value being used for calculation of the engine torque ($C_{gi}$) during the ensuing firing phase, followed by:

a stage of slow acquisition performed during operation of the engine in each phase of nonfiring, comprising filtering of the first order of each value [$B_i$(pmh)]

corresponding to the half-revolution of order i, calculated at each top dead point of order (pmh):

$$\beta_{if}(pmh)=\beta_{if}(pmh-1)+q[\beta_i(pmh)-\beta_{if}(pmh-1)]$$

delivering a filtered value [$\beta_i$(pmh)] as a function of the filtered value at the preceding top dead point of order (pmh−1) and of a filtering coefficient (q) chosen according to the response time desired for calculation of the torque, the final filtered value [B$_{if}$(pmh)] obtained at the last top dead point of the nonfiring phase being used for calculation of the engine torque ($C_{gi}$) during the subsequent firing phase.

6. A process for calculating the torque according to claim 1, characterized in that the numerical value ($\Sigma$) representative of the projection, on the phase reference line of the teeth corresponding to the origin of the angular periods of the firings, of the amplitude of the alternating component of the instantaneous durations ($d_j$) at the frequency of firings in the engine, is defined, for example, by the relationship:

$$\Sigma = \sum_{j=0}^{(n-1)} d_j \cos(2\pi j/n).$$

7. A process for calculating the torque according to claim 2, characterized in that the slow acquisition of the term ($\beta_i$) takes place between two thresholds of engine rpm, which are calibration variables, for example the minimum threshold being 3000 rpm and the maximum threshold being 3500 rpm.

8. A process for calculating the torque according claim 2, for a four-cylinder heat engine, characterized in that it comprises correcting the defects of the target by:

distinguishing between the two half-revolutions ($T_i$) of the target relative to the reference, where i is an integer equal to 1 or 2;

assignment of a term ($\beta_i$) for each of the intervals ($T_i$);

and at each top dead point:

recognition of torque conditions corresponding to absence of firing in the cylinders;

acquisition of the term ($\beta_i$) under the said conditions of nonfiring by measurement of the engine torque ($C_i$), which is proportional to the pressure ($P_{manifold}$) in the intake manifold according to the relationship:

$$C_i = KP_{manifold} = \alpha(\Sigma N + \beta_i)N^2$$

where N is the engine rpm, K is a proportionality coefficient and $\alpha$ is a constant term;

calculation of the engine torque ($C_{gi}$) delivered during the phase of acceleration of the engine upon each firing, corresponding to each half-revolution ($T_i$), from the term ($\beta_i$), which is obtained from the equation:

$$C_{gi} = \alpha(\Sigma N + \beta_i)N^2.$$

9. A process for calculating the torque according claim 3, for a four-cylinder heat engine, characterized in that it comprises correcting the defects of the target by:

distinguishing between the two half-revolutions ($T_i$) of the target relative to the reference, where i is an integer equal to 1 or 2;

assignment of a term ($\beta_i$) for each of the intervals ($T_i$);

and at each top dead point:

recognition of torque conditions corresponding to absence of firing in the cylinders;

acquisition of the term ($\beta_i$) under the said conditions of nonfiring by measurement of the engine torque ($C_i$), which is proportional to the pressure ($P_{manifold}$) in the intake manifold according to the relationship:

$$C_i = KP_{manifold} = \alpha(\Sigma N + \beta_i)N^2$$

where N is the engine rpm, K is a proportionality coefficient and $\alpha$ is a constant term;

calculation of the engine torque ($C_{gi}$) delivered during the phase of acceleration of the engine upon each firing, corresponding to each half-revolution ($T_i$), from the term ($\beta_i$), which is obtained from the equation:

$$C_{gi} = \alpha(\Sigma N + \beta_i)N^2.$$

10. A process for calculating the torque according claim 2, characterized in that the numerical value ($\Sigma$) representative of the projection, on the phase reference line of the teeth corresponding to the origin of the angular periods of the firings, of the amplitude of the alternating component of the instantaneous durations ($d_j$) at the frequency of firings in the engine, is defined, for example, by the relationship:

$$\Sigma = \sum_{j=0}^{(n-1)} d_j \cos(2\pi j/n).$$

11. A process for calculating the torque according claim 3, characterized in that the numerical value ($\Sigma$) representative of the projection, on the phase reference line of the teeth corresponding to the origin of the angular periods of the firings, of the amplitude of the alternating component of the instantaneous durations ($d_j$) at the frequency of firings in the engine, is defined, for example, by the relationship:

$$\Sigma = \sum_{j=0}^{(n-1)} d_j \cos(2\pi j/n).$$

12. A process for calculating the torque according claim 4, characterized in that the numerical value ($\Sigma$) representative of the projection, on the phase reference line of the teeth corresponding to the origin of the angular periods of the firings, of the amplitude of the alternating component of the instantaneous durations ($d_j$) at the frequency of firings in the engine, is defined, for example, by the relationship:

$$\Sigma = \sum_{j=0}^{(n-1)} d_j \cos(2\pi j/n).$$

13. A process for calculating the torque according claim 5, characterized in that the numerical value ($\Sigma$) representative of the projection, on the phase reference line of the teeth corresponding to the origin of the angular periods of the firings, of the amplitude of the alternating component of the instantaneous durations ($d_j$) at the frequency of firings in the engine, is defined, for example, by the relationship:

$$\Sigma = \sum_{j=0}^{(n-1)} d_j \cos(2\pi j/n).$$

* * * * *